United States Patent
Lin et al.

(10) Patent No.: US 9,899,909 B2
(45) Date of Patent: Feb. 20, 2018

(54) CONTROL DEVICE AND METHOD OF TOTEM-POLE BRIDGELESS PFC SOFT SWITCH

(71) Applicant: ZTE CORPORATION, Shenzhen, Guangdong Province (CN)

(72) Inventors: Guoxian Lin, Shenzhen (CN); Jianping Zhou, Shenzhen (CN); Tao Liu, Shenzhen (CN); Junming Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1 day.

(21) Appl. No.: 15/028,131

(22) PCT Filed: Jun. 20, 2014

(86) PCT No.: PCT/CN2014/080389
§ 371 (c)(1),
(2) Date: Apr. 8, 2016

(87) PCT Pub. No.: WO2015/051648
PCT Pub. Date: Apr. 16, 2015

(65) Prior Publication Data
US 2016/0241132 A1    Aug. 18, 2016

(30) Foreign Application Priority Data

Oct. 8, 2013    (CN) .......................... 2013 1 0466156

(51) Int. Cl.
*H02M 1/42* (2007.01)
*H02M 7/217* (2006.01)
(Continued)

(52) U.S. Cl.
CPC ........... *H02M 1/42* (2013.01); *H02M 1/4225* (2013.01); *H02M 2001/0058* (2013.01);
(Continued)

(58) Field of Classification Search
CPC .... H02M 1/42; H02M 1/4208; H02M 1/4225; H02M 1/4233; H02M 2001/0058;
(Continued)

(56) References Cited

U.S. PATENT DOCUMENTS 5,617,013 A *  4/1997  Cozzi .................. H02H 7/1255
                                                323/207
6,556,464 B2 * 4/2003  Sakai .................. H02M 1/4216
                                                363/132
(Continued)

FOREIGN PATENT DOCUMENTS

CN       101552546 A1   10/2009
CN       101621247 A     1/2010
(Continued)

OTHER PUBLICATIONS

The Supplementary European Search Report dated Aug. 29, 2016 in Application No. 14852779.9.
(Continued)

*Primary Examiner* — Adolf Berhane
*Assistant Examiner* — Sisay G Tiku
(74) *Attorney, Agent, or Firm* — Plumsea Law Group, LLC

(57) ABSTRACT

Disclosed are a totem-pole bridgeless power factor correction (PFC) soft switch control device and method, wherein, the device includes a totem pole bridgeless PFC circuit, and the totem pole bridgeless PFC circuit includes at least two bridge arms connected in parallel between a first connecting point and a second connecting point: the first bridge arm includes two switches or diodes connected in serial in a same direction, the second bridge arm includes two switches that are connected in serial in the same direction, the totem pole bridgeless PFC circuit includes at least one PFC inductor, and further a filter capacitor and a load connected in parallel
(Continued)

between the first connecting point and the second connecting point.

10 Claims, 9 Drawing Sheets

(51) Int. Cl.
  *H02M 7/219*   (2006.01)
  *H02M 7/162*   (2006.01)
  *H02M 7/06*    (2006.01)
  H02M 1/00    (2006.01)

(52) U.S. Cl.
  CPC ......... *Y02B 70/126* (2013.01); *Y02B 70/1491* (2013.01); *Y02P 80/112* (2015.11)

(58) Field of Classification Search
  CPC ...... H02M 7/217; H02M 7/219; H02M 7/162; H02M 7/06
  See application file for complete search history.

(56) References Cited

U.S. PATENT DOCUMENTS

| | | | | |
|---|---|---|---|---|
| 7,630,221 | B2* | 12/2009 | Sui | G05F 1/70 |
| | | | | 323/207 |
| 8,717,791 | B2* | 5/2014 | Wildash | H02M 1/4208 |
| | | | | 323/207 |
| 9,431,896 | B2* | 8/2016 | Ye | H02M 1/4208 |
| 9,479,046 | B2* | 10/2016 | Lin | H02M 1/42 |
| 2009/0230929 | A1* | 9/2009 | Sui | G05F 1/70 |
| | | | | 323/207 |
| 2011/0149622 | A1* | 6/2011 | Lin | H02M 1/4208 |
| | | | | 363/124 |
| 2012/0139505 | A1 | 6/2012 | Ren et al. | |
| 2012/0293141 | A1* | 11/2012 | Zhang | H02M 1/4233 |
| | | | | 323/207 |
| 2013/0077365 | A1* | 3/2013 | Chalermboon | H02M 1/4208 |
| | | | | 363/89 |
| 2013/0249504 | A1* | 9/2013 | Hsu | H02M 1/4225 |
| | | | | 323/207 |
| 2014/0035541 | A1* | 2/2014 | Jin | G05F 1/70 |
| | | | | 323/210 |
| 2016/0028304 | A1* | 1/2016 | O'Day | H02M 1/4225 |
| | | | | 363/89 |
| 2016/0134185 | A1* | 5/2016 | Wang | H02M 1/42 |
| | | | | 323/235 |
| 2017/0045555 | A1* | 2/2017 | Liu | G01R 15/183 |

FOREIGN PATENT DOCUMENTS

| | | |
|---|---|---|
| CN | 102035364 A1 | 4/2011 |
| CN | 102130581 A | 7/2011 |
| JP | 2011223800 A | 11/2011 |
| JP | 2013165553 A | 8/2013 |

OTHER PUBLICATIONS

Firmansyah, E. et al: "A Critical-Conduction-Mode Bridgeless Interleaved Boost Power Factor Correction", Telecommunication Energy Conference, 2009. Intelec 2009 31st International; Dec. 31, 2009, the mail body, pp. 109-114, and figures 1-16.

International Search Report and Written Opinion dated Sep. 1, 2014 in PCT Application No. PCT/CN2014/080389.

Japanese Office Action dated Mar. 21, 2017 for Japanese Application No. 2016-521360.

* cited by examiner

CONTROL DEVICE AND METHOD OF TOTEM-POLE BRIDGELESS PFC SOFT SWITCH

CROSS-REFERENCE TO RELATED APPLICATION(S)

This application is the U.S. National Phase application of PCT application number PCT/CN2014/080389 having a PCT filing date of Jun. 20, 2014, which claims priority of Chinese patent application 201310466156.4 filed on Oct. 8, 2013, the disclosures of which are hereby incorporated by reference.

TECHNICAL FIELD

The present document relates to the field of power supply technology, and more particularly, to a totem pole bridgeless power factor correction soft switch control device and method.

BACKGROUND OF RELATED ART

Research on single-phase power factor correction (PFC) rectification technology is moving in the trend of high efficiency and high power density, and the totem pole bridgeless PFC topology was proposed in responsive to this trend, as shown in FIG. 1. A totem pole bridgeless boost converter circuit system comprises an alternating current input voltage AC, a boost inductor L, four switches S1, S2, S3 and S4, a filter capacitor Co and a load Ro. In the positive half cycle of the alternating current input voltage AC, the switch S2 is always closed, the S1 is opened, the switch S4 is closed, the switch S3 is opened, in this case, it is a process that the current on the inductor L increases and energy is stored, after the energy storage process of the inductor L is completed, and when the switch S3 is closed and the switch S4 is closed, it is a process that the current on the inductor L decreases, and the inductor L releases energy; when the input AC voltage is in the negative half cycle, the switch S1 is always closed, the S2 is opened, the switch S3 is closed, and the switch S4 is opened, in this case, the current on the inductor is increasing constantly, and the inductor stores energy, after the energy storage of the inductor L is completed, the switch S4 is closed, the switch S3 is opened, and in this case, the current on the inductor decreases, and the inductor L releases energy.

In the abovementioned totem pole bridgeless PFC circuit system, due to the limits of the topology structure itself, the totem pole PFC cannot, like a two-way switch bridgeless PFC, use the fast recovery diode characteristics to improve the EMI, meanwhile, the hard-switching characteristics of the CCM mode cannot make it meet the industry's growing demand for high efficiency. To solve the abovementioned problems, it can use a topology based on the TCM (triangular current mode) mode and simplified from the totem pole, if it is controlled to achieve the full AC input voltage under the TCM mode, the ZVS (zero voltage switching) characteristics or VS (valley switching) characteristics in the full load range, it can meet requirements of high power density and high efficiency.

However, in the practice and research process of abovementioned control strategy, there are the following problems: in the existing totem pole converter circuit system, it needs to timely and accurately detect an inductor voltage reversal signal of the PFC for achieving the timing control of the power frequency switches S1 and S2 and the high frequency switches S3 and S4, so as to achieve the VS or ZVS control in the full input AC voltage and the full load range under the TCM mode. Otherwise, the switch might be conducted when there is still high voltage going through, and the efficiency of the totem pole bridgeless PFC is low.

SUMMARY

The embodiment of the present document provides a totem pole bridgeless PFC soft switch control device and method to solve the problem of low efficiency of the totem pole bridgeless PFC.

A totem pole bridgeless PFC soft switch control device, includes a totem pole bridgeless PFC circuit, and the totem pole bridgeless PFC circuit comprises at least two bridge arms connected in parallel between a first connecting point and a second connecting point, a first bridge arm comprises two switches or diodes connected in serial in a same direction, a second bridge arm comprises two switches connected in serial in a same direction, the totem pole bridgeless PFC circuit comprises at least one PFC inductor, and further a filter capacitor and a load connected in parallel between the first connecting point and the second connecting point, the device further comprises:

a voltage detecting module, a signal processing module and a switch controlling module;

the voltage detecting module is connected to a PFC inductor of the totem pole bridgeless PFC circuit, and is configured to detect a voltage on the PFC inductor;

the signal processing module is connected to the voltage detecting module, and is configured to receive a voltage signal detected by the voltage detecting module, and when the voltage on the PFC inductor reverses from positive to negative or from negative to positive, output a square wave signal, and after a certain time delay, process the square-wave signal to become a soft switching or valley switching signal of a switch, and provide the signal to the switch controlling module;

the switch controlling module is connected to all switches of the totem pole bridgeless PFC circuit.

Preferably, the voltage detecting module is connected to both terminals of the PFC inductor via a resistor.

Preferably, the voltage detecting module is coupled to a core of the PFC inductor via a single inductor auxiliary winding.

Preferably, the voltage detecting module is coupled to the core of the PFC inductor through a first inductor auxiliary winding and a second inductor auxiliary winding, a first terminal of the first inductor auxiliary winding and a first terminal of the second inductor auxiliary winding are dotted terminals, a second terminal of the second inductor auxiliary winding and the first terminal of the second inductor auxiliary winding are connected together and grounded.

Preferably, the signal processing module comprises: a comparing unit, a delaying unit, an input voltage polarity judging unit and a channel selecting unit, wherein:

the voltage detecting module is configured to output voltage signals of both terminals of the PFC inductor through two-channel outputs, be connected to a non-inverting input terminal of the comparing unit via one of the two-channel outputs, and connected to an inverting input terminal of the comparing unit via the other one of the two-channel outputs;

when the voltage on the PFC inductor reverses from positive to negative or from negative to positive, the comparing unit is configured to output a square wave signal to the delaying unit, the delaying unit is configured to send the square wave signal to the channel selecting unit after a certain time delay, and the channel selecting unit is configured to perform a channel selection to select a corresponding square wave signal of the voltage detecting module based on an input voltage polarity output by the input voltage polarity judging unit, and send the square wave signal to the switch controlling module.

The embodiment of the present document further provides a totem pole bridgeless PFC soft switch control method using the above totem pole bridgeless power factor correction soft switch control device, comprising:

a signal processing module detecting a reversal of a voltage on a PFC inductor;

when detecting that the voltage on the PFC inductor reverses, the signal processing module generating a soft switching or valley switching signal of a switch, and sending the signal to a switch controlling module.

Preferably, the signal processing module detecting a reversal of a voltage on a PFC inductor comprises:

a comparing unit of the signal processing module receiving the voltage on the PFC inductor sent by the voltage detecting module.

Preferably, when detecting that the voltage on the PFC inductor reverses, the signal processing module generating a soft switching or valley switching signal of a switch and sending the signal to a switch controlling module comprises:

the comparing unit generating a square wave signal and sending the square wave signal to a delaying unit of the signal processing module when the voltage on the PFC inductor reverses from positive to negative or from negative to positive;

the delaying unit delaying the square wave signal and sending the square wave signal to a channel selecting unit of the signal processing module;

the channel selecting unit selecting a corresponding soft switching or valley switching signal of a switch based on a voltage polarity output by an input voltage polarity judging unit of the signal processing module, and sending the signal to the switch controlling module.

Preferably, after the step of when detecting that the voltage on the PFC inductor reverses, the signal processing module generating a soft switching or valley switching signal of a switch and sending the signal to a switch controlling module, the method further comprises:

the switch controlling module forcibly conducting a corresponding switch, enabling zero voltage switching or valley switching of the switch.

Preferably, the method further comprises:

after any one of the switches in the totem pole bridgeless PFC circuit is off and a reverse recovery of a body diode of the switch is completed, the totem pole bridgeless PFC circuit is resonant with a junction capacitor in the switch, and the voltage of the PFC inductor generates a voltage reversal.

The embodiment of the present document provides a totem pole bridgeless power factor correction soft switch control device and method to detect a reversal of a voltage on a PFC inductor, and when detecting that the voltage on the PFC inductor reverses, a signal processing module generates a soft switching or valley switching signal of a switch and sends it to a switch controlling module, so as to monitor the voltage on the PFC inductor in real time and achieve a circuit control based on the monitoring way, and solve the problem that the efficiency of the totem pole bridgeless PFC circuit is low.

PREFERRED EMBODIMENTS

In the existing totem pole conversion circuit system, based on the above controlling ideas, it needs to timely and accurately detect the inductor voltage reversal signal of the PFC circuit for realizing the timing control of the power frequency switches S1 and S2 and the high frequency switches S3 and S4, so as to achieve the VS or ZVS control in the full input AC voltage and the full load range under the TCM mode.

To solve the abovementioned problem, the embodiment of the present document provides a totem pole bridgeless power factor correction soft switch control device and method. Hereinafter, in conjunction with the accompanying drawings, embodiments of the present document will be described in detail. It should be noted that, in the case of no conflict, embodiments and features in the embodiments of the present application may be arbitrarily combined with each other.

First, in conjunction with the accompanying drawings, the first embodiment of the present document will be described.

The embodiment of the present document provides a totem pole bridgeless PFC soft switch control device to avoid the switch being conducted when there is still high voltage on the switch and to increase the efficiency of the totem pole bridgeless PFC circuit.

Figure 1:
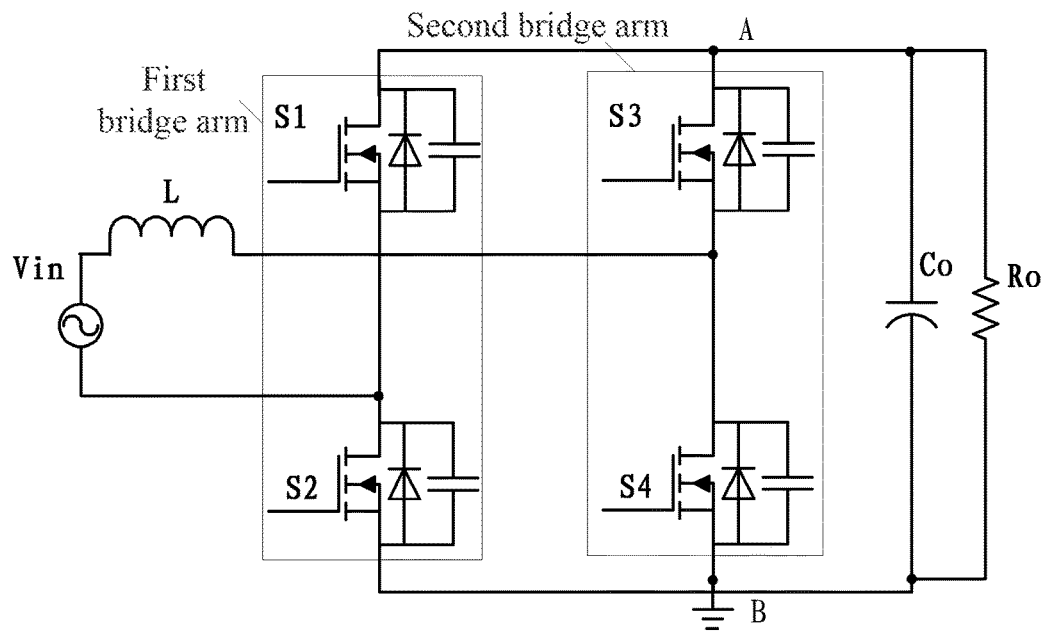
FIG. 1 is a schematic diagram of the structure of a totem pole bridgeless PFC system.
Figure 2:
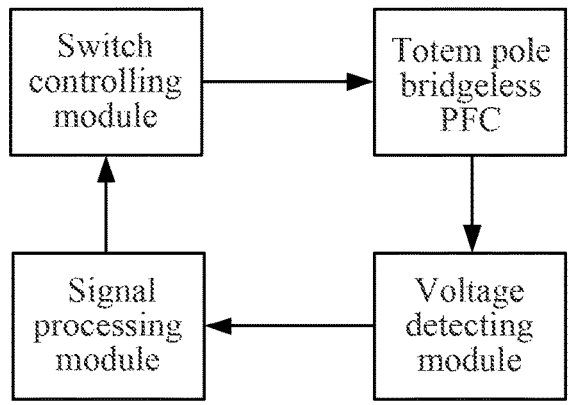
FIG. 2 is a schematic diagram of the structure of a totem pole bridgeless power factor correction soft switch control device provided in a first embodiment of the present document.

To achieve the abovementioned purpose, the structure of the totem pole bridgeless PFC soft switch control device in accordance with the embodiment of the present document is shown in FIG. 2, comprising: a totem pole bridgeless PFC circuit, a voltage detecting module, a signal processing module and a switch controlling module, wherein:

the totem pole bridgeless PFC circuit comprises at least two bridge arms connected in parallel between a first connecting point and a second connecting point, the first bridge arm comprises two switches or diodes connected in serial in the same direction, and the second bridge arm comprises two switches connected in serial in the same direction, the totem pole bridgeless PFC circuit comprises at least one PFC inductor, and further a filter capacitor and a load connected in parallel between the first connecting point and the second connecting point, the voltage detecting module is connected to a PFC inductor of the totem pole bridgeless PFC circuit, and is configured to detect the voltage on the PFC inductor;

the signal processing module is connected to the voltage detecting module, and is configured to receive a signal detected by the voltage detecting module, and when the voltage on the PFC inductor is reversed from positive to negative or from negative to positive, output a square wave signal after a certain time delay, and process the square-wave signal to be a soft switching or valley switching signal, and provide the signal to the switch controlling module;

the switch controlling module is connected to all switches of the totem pole bridgeless PFC circuit.

The voltage detecting module detects a voltage across the PFC inductor by adding a auxiliary winding on the PFC inductor of the totem pole bridgeless PFC circuit or by using a resistor to directly detect the voltage across the inductor. Preferably, the voltage detecting module is connected to both terminals of the PFC inductor via a resistor; or coupled to the core of the PFC inductor via a single inductor auxiliary winding; or coupled to the core of the PFC inductor through the first inductor auxiliary winding and the second inductor auxiliary winding, a first terminal of the first inductor auxiliary winding and a first terminal of the second inductor auxiliary winding are dotted terminals, a second terminal of the second inductor auxiliary winding and the first terminal of the second inductor auxiliary winding are connected together and grounded.

The current of the PFC inductor increases from the minimum to the maximum and then decreases from the maximum to the a minimum in a switching period, the voltage on the PFC inductor reverses twice in one switching cycle, one reversal is from a positive voltage to a negative voltage, and the other reversal is from a negative voltage to a positive voltage;

the voltage detecting module sends the detected PFC inductor voltage to the comparing unit to be processed, the non-inverting input terminal of the comparing unit is connected to the sampled voltage signal at one terminal of the PFC inductor, and the inverting input terminal of the comparing unit is connected to the sampled voltage signal at the other terminal of the PFC inductor; because the PFC inductor voltage would reverse at the maximum and the minimum of the inductor current, the comparing unit would reverse at the maximum and the minimum of the PFC inductor current to obtain a square wave signal;

when the switch of the totem pole bridgeless PFC circuit is off, after the reverse recovery of its body diode is completed, the PFC inductor is resonant with the junction capacitor on the switch, at this time, the voltage on the PFC inductor reverses, from negative to positive, the comparing unit outputs a rising edge from low level to high level, sends the rising edge to pass through the delaying unit, after a certain time delay, the voltage on the switch is resonant to zero or the valley, and it sends the signal to the switch controlling module as an ON judging signal of the corresponding switch, and forcibly conducts the switch, to achieve zero-voltage switching or valley switching of the switch.

The signal processing module further comprises a comparing unit, a delaying unit, an input voltage polarity judging unit and a channel selecting unit. The non-inverting input terminal of the comparing unit is connected to one terminal of the PFC inductor voltage of the totem pole bridgeless PFC circuit (or connected to a voltage reference), and the inverting input terminal is connected to the other terminal of the PFC inductor voltage of the totem pole bridgeless PFC circuit, it is configured to detect the signal indicating that the voltage across the inductor reverses, the output terminal is connected to the input terminal of the signal processing module. Since the voltage at the non-inverting input terminal and the voltage at the inverting input terminal of the comparing unit continuously change, the output terminal of the comparing unit will continue to carry out high level-low level switching, therefore, the comparing unit will obtain a square wave signal, and the square wave signal enters into the delaying unit. The input terminal of the delaying unit is connected to the output terminal of the comparing unit of the voltage detecting module, and after a certain time delay, the signal is output to the channel selecting unit, the selecting terminal of the channel selecting unit is connected to the output terminal of the AC input voltage polarity judging unit, and by judging the polarity of the AC input voltage, different outputs of voltage detecting module are selected, at this point, the voltage on the switch (if the switch is a MOSFET, it is the DS voltage) is resonant to 0V or to the valley minimum value, the output signal of the signal processing module is sent to the switch controlling module to trigger the switch corresponding to the totem pole bridgeless PFC circuit to be conducted, so as to achieve zero voltage switching or valley switching of the switch of the totem pole bridgeless PFC circuit.

In the following, in conjunction with the accompanying drawings, the second embodiment of the present document will be described.

Figure 3:
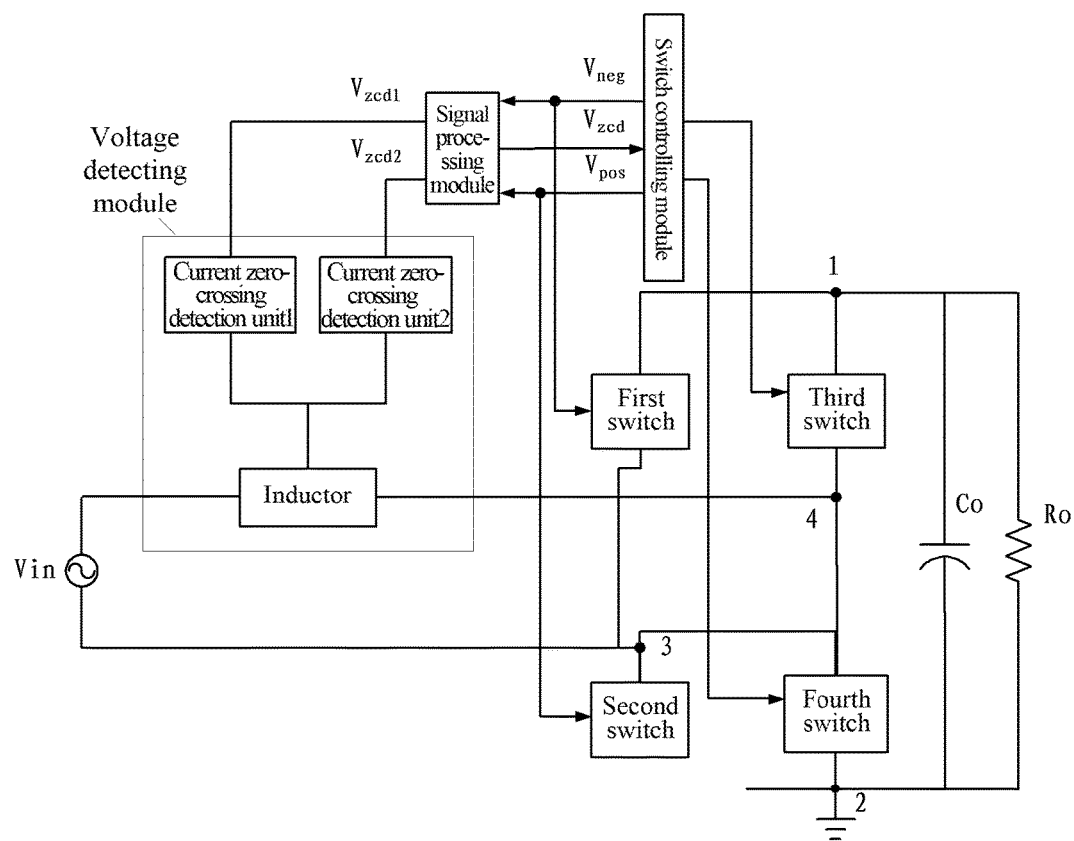
FIG. 3 is a schematic diagram of the structure of the totem pole bridgeless power factor correction soft switch control device provided in a second embodiment of the present document.
Figure 4:
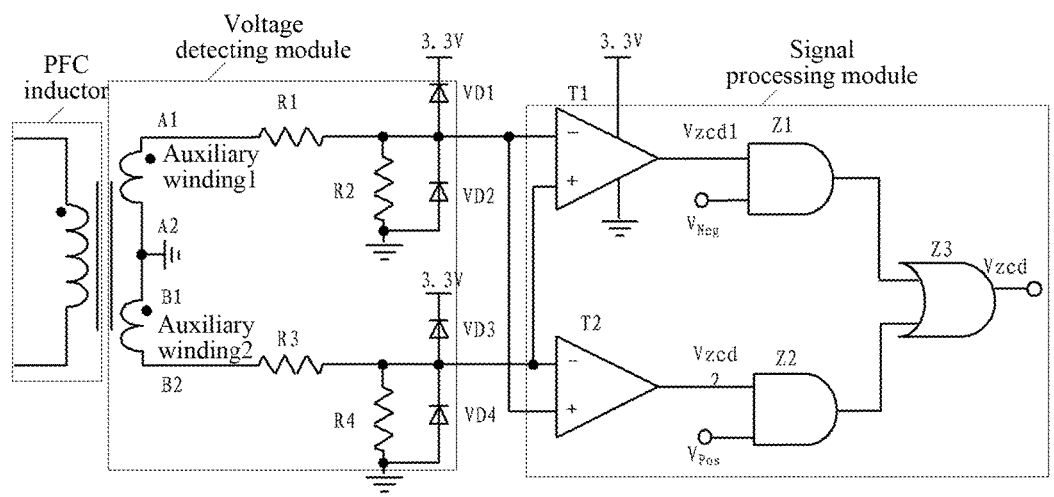
FIG. 4 is a schematic diagram of the internal structure of a voltage detecting module and a signal processing module involved in the second embodiment of the present document.

FIG. 3 is a schematic diagram of the structure of the totem pole bridgeless PFC soft switch control device provided in the embodiment of the present document, FIG. 4 is a schematic diagram of the internal structure of a voltage detecting module and a signal processing module related in the embodiment of the present document. The embodiment of the present document takes an application example to describe the soft switch control device of the totem pole bridgeless PFC circuit in accordance with the embodiment of the present document, and of course, the totem pole bridgeless power factor correction soft switch control device is not limited to this form of the present embodiment, and one skilled in the art can also choose to use other similar forms according to his/her expertise, as long as the function of each abovementioned module can be realized. Herein, the voltage detecting module detecting the voltage on the totem pole bridgeless PFC inductor is taken as an example to describe, as shown in FIG. 4. Two auxiliary windings are added on the totem pole bridgeless PFC inductor, and are respectively used to detect the corresponding different voltages on the inductor in the positive half cycle of the AC input voltage and the negative half cycle of the AC input voltage, the A1 terminal of the auxiliary winding 1 and the B1 terminal of the auxiliary winding 2 are dotted terminals, the A2 terminal of the auxiliary winding 1 and the B1 terminal of the auxiliary winding 2 are connected together and grounded. The A1 of the auxiliary winding 1 is connected to the divider resistors R1 and R2, and then through the clamping diodes VD1 and VD2, the detected voltage is kept in the range of 0~3.3V; the B2 terminal of the auxiliary winding 2 also first passes through the divider resistors R3 and R4, and then is connected to the clamping diodes VD3 and VD4, similarly, the voltage signal detected by it is also clamped between 0~3.3V. Because the A1 terminal of the auxiliary winding 1 and the B2 terminal of the auxiliary winding 2 are two synonyms ends, and their other terminals are commonly connected and grounded, therefore, the signal detected by the A1 terminal and the signal detected by the B2 terminal are opposite.

Figure 5:
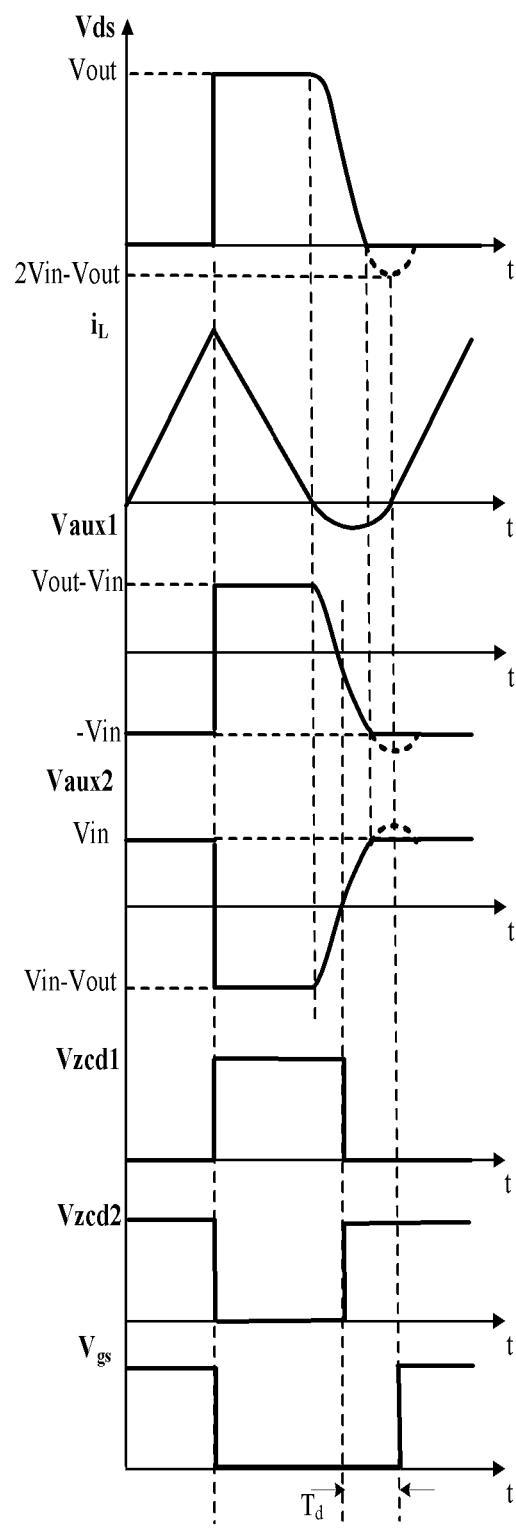
FIG. 5 is a waveform of a working process of the totem pole bridgeless PFC soft switch control device provided in the second embodiment of the present document when the AC input voltage is less than one-half of the output voltage.
Figure 6:
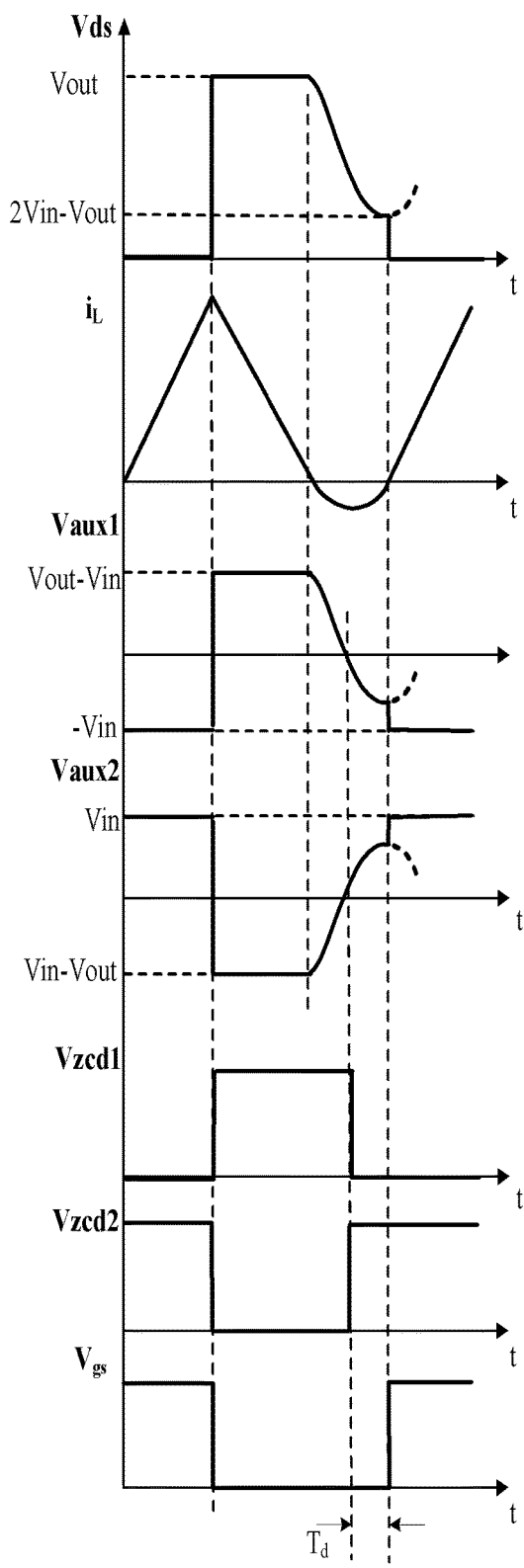
FIG. 6 is a waveform of a working process of the totem pole bridgeless PFC soft switch control device provided in the second embodiment of the present document when the AC input voltage is larger than one-half of the output voltage.

The signal processing modules has two comparing units T1 and T2, wherein the signal of the B2 terminal of the auxiliary winding 2 after passing through the divider resistor and the clamping diode works as the non-inverting input signal of the comparator T1, and the signal of the A1 terminal of the auxiliary winding after passing through the divider resistor and the clamping diode works as the inverting input signal of the comparator T1; the non-inverting and inverting input signals of the comparing unit T2 are exactly the opposite of those of the comparing unit 1. Thus, the output signals of the comparing unit T1 and the comparing unit T2 are exactly the opposite. When the AC input voltage is in the positive half cycle, the waveform of its working process is shown in FIG. 5 and FIG. 6, the switch of the totem pole bridgeless PFC circuit is taken as an example of a MOSFET, wherein, FIG. 5 is the case that the AC input voltage is less than one half of the output voltage, and FIG. 6 is the case that the AC input voltage is greater than one half of the output voltage. In the power frequency positive half cycle of the AC input voltage, in FIG. 3, the second switch S2 remains ON, when the fourth switch S4 is ON, the current on the PFC inductor begins to rise, the voltage detected at the A1 terminal of the auxiliary winding 1 is positive, and the voltage detected at the B2 terminal of the auxiliary winding 2 is negative, therefore the output of the comparing unit T2 is of high level, while the output of the comparing unit T1 is of low level. When the inductor current rises to the maximum, the fourth switch S4 is OFF, and the third switch S3 is ON, then the inductor current begins to decrease, and when the inductor current drops to zero, the third switch S3 is OFF, because the body diode of the third switch S3 needs a reverse recovery time, the inductor current starts to increase in the reversal direction, then the circuit is in the resonant state, the DS voltage of the switch S4 is slowly resonant to 0V or to the valley, the voltage Vaux1 detected at the A1 terminal of the inductor auxiliary winding 1 changes from positive to negative, and the voltage Vaux2 detected at the B2 terminal of the inductor auxiliary winding 2 is exactly the opposite, therefore the output signal of the comparing unit T2 reverses from a low level to a high level, and this reversed signal is delayed with a certain time to work as a triggering condition of the switch controlling module and generate a driving signal of the MOS GS to conduct the fourth switch S4, thus to achieve the zero-voltage switching or the valley switching of the fourth switch, and to reduce the loss of the conduction and improve the efficiency. Due to the symmetry of the circuit, when the AC input voltage works at the power frequency negative half cycle, the comparing unit T1 also obtains a signal reversed from a low level to a high level, and the signal also works as the triggering condition of the switch controlling module to conduct the third switch S3, so as to achieve the zero voltage switching or the valley switching of the third switch in the negative half cycle of the AC input voltage, thus to reduce the losses of the switch and to improve the efficiency.

Figure 7:
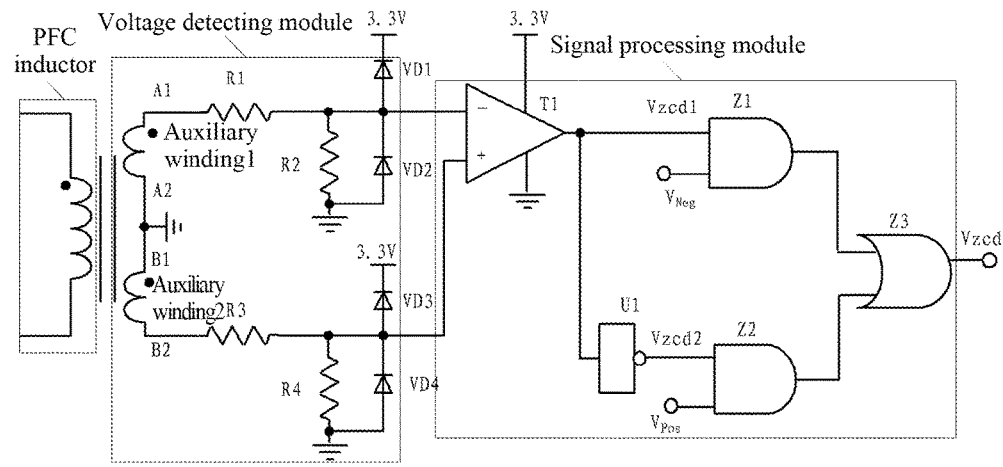
FIG. 7 is a schematic diagram of the internal structure of the voltage detecting module and the signal processing module after replacing the comparing unit T2 in FIG. 4 with an inverter.

From the above analysis, it can be known that, the output signals of the comparing unit T1 and the comparing unit T2 are exactly the opposite, so it is possible to replace the comparing unit T2 with an inverter, as shown in FIG. 7, the comparing unit T1 outputs a power frequency AC input voltage as the detected signal in the negative half cycle, and then the signal passes through the inverter to obtain the detected signal in the positive half cycle of the power frequency AC input voltage, this inversion function may be implemented by hardware or software implemented by digital signal processing (referred to as DSP).

Figure 8:
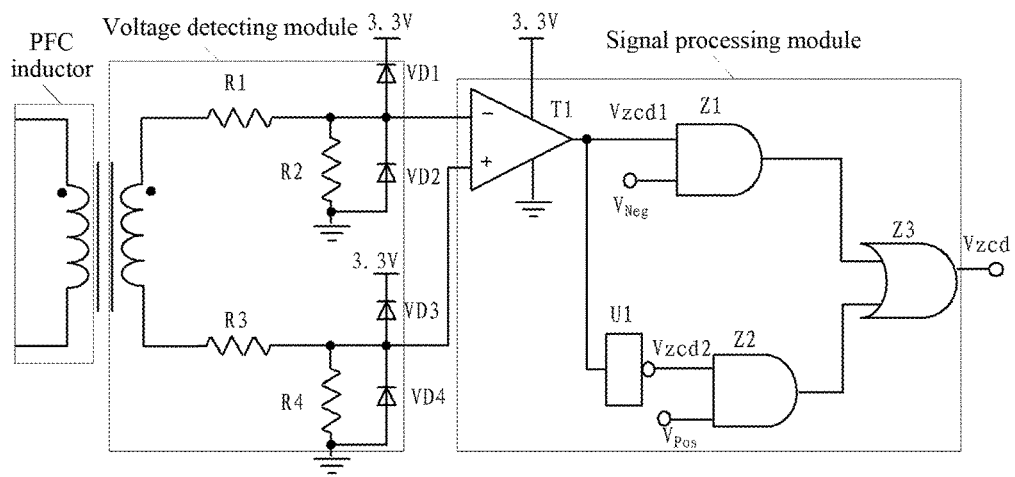
FIG. 8 is a schematic diagram of the internal structure of the voltage detecting module and the signal processing module when both terminals of a single auxiliary winding work as positive and negative inputs of the comparator after passing through a divider resistor and a clamping diode.

Because the voltages detected by the abovementioned auxiliary winding 1 and auxiliary winding 2 are just the opposite, two terminals of a single auxiliary winding can be used as the positive and negative inputs of the comparator after passing through the divider resistor and the clamping diode, as shown in FIG. 8, the inductor voltage signal detection in the negative half cycle of the AC input voltage can be obtained, and then the inverter can be used to obtain the inductor voltage detection in the positive half cycle of of the AC input voltage.

Figure 9:
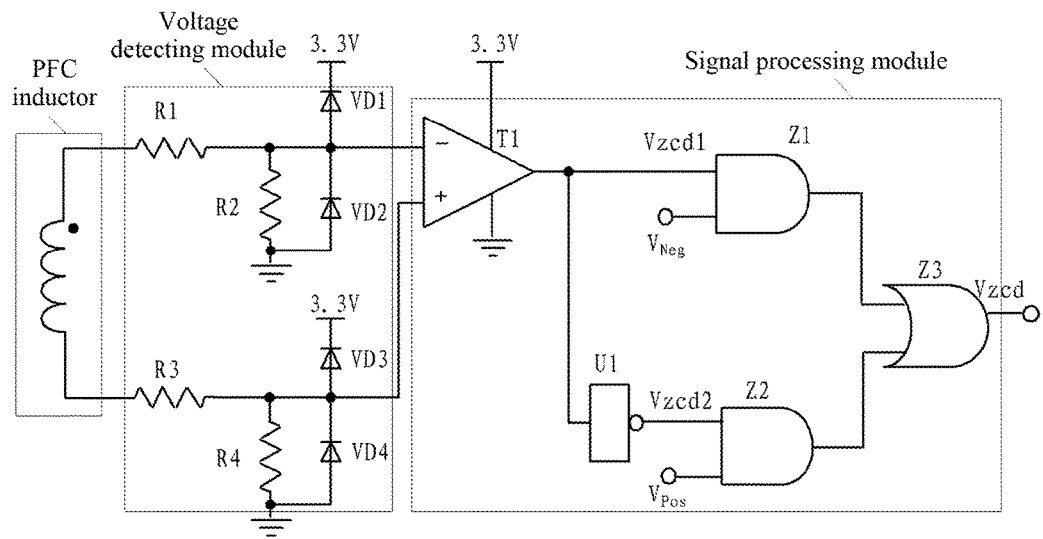
FIG. 9 is a schematic diagram of a circuit that directly detects the voltage across the inductor directly through a divider resistor in the totem pole without power factor correction soft switch control device provided in the second embodiment of the present document.

FIG. 9 is a schematic diagram of the circuit that directly detects the voltage across the inductor directly through the divider resistor in the totem pole bridgeless PFC soft switch control device provided in the embodiment of the present document.

Figure 10:
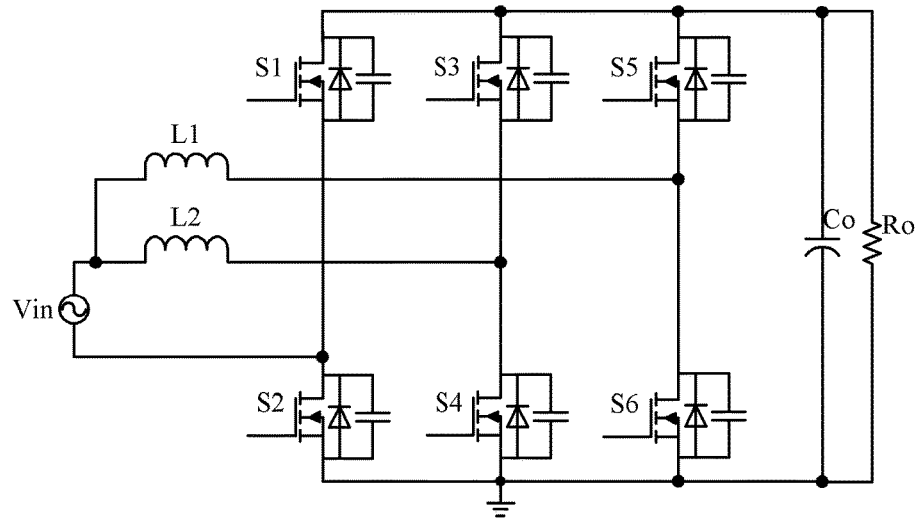
FIG. 10 is a schematic diagram of the structure of totem pole bridgeless PFC circuits being staggered in parallel.

In order to increase the power density of the power module, totem pole bridgeless PFC circuits staggered in parallel are always used. As shown in FIG. 10, it is a schematic diagram of totem pole bridgeless PFC circuits staggered in parallel.

Figure 11:
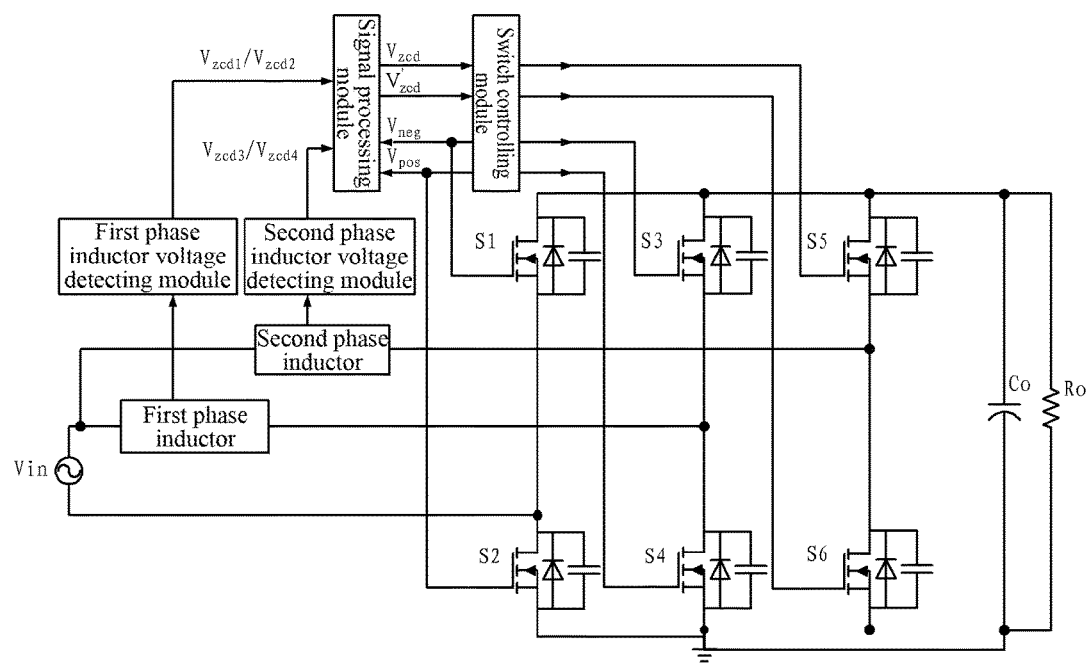
FIG. 11 is a schematic diagram of the structure of the totem poles bridgeless PFC circuit soft switch control device with the staggered parallel structure shown in FIG. 10.

FIG. 11 shows the totem poles bridgeless PFC circuit soft switch control device using the staggered parallel structure shown in FIG. 10. Its implementation principle is the same as that of the totem pole bridgeless PFC circuit soft switch control device shown in FIG. 3, both sides of the first phase inductor is connected to the first phase inductor voltage detecting module, the added second phase inductor is also connected to the second phase inductor voltage detecting module, the signal detected by it is used as the conducting condition of the second phase switch.

Figure 12:
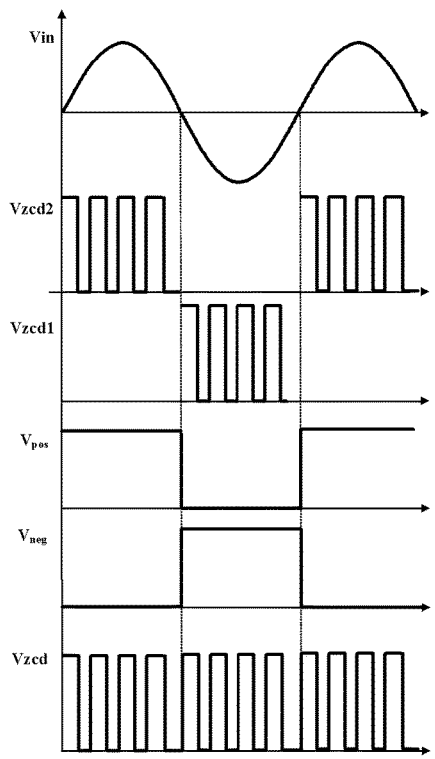
FIG. 12 is an operational waveform of the signal processing circuit in the totem pole bridgeless PFC soft switch control device provided in the second embodiment of the present document.

FIG. 12 shows a working waveform of the signal processing circuit, the valid voltage detection signal Vzcd2 is obtained when the AC input voltage Vin is in the positive half cycle, while Vzcd1 is an invalid signal, and on the contrary, when the AC input voltage Vin is in the negative half-cycle, the valid voltage detection signal Vzcd1 is obtained, while the Vzcd2 is an invalid signal. Thus, a switching control unit is used to provide power frequency signals VPos and VNeg representing the positive half cycle and the negative half cycle, and these two signals are used to control the ON or OFF of the first switch and the second switch in FIG. 3, and are also used respectively to shield unwanted signals in the positive and negative half cycles to obtain the valid voltage detection signal Vzcd in both positive and negative half cycles.

For convenience of explanation, the embodiment of the present document takes the totem pole bridgeless PFC circuit using a switch as an example. In particular, the switch may also be replaced with a diode. When using a diode, the function provided and the effect achieved by the totem pole bridgeless PFC circuit provided in the embodiment of the present document are not different from those when using a switch, and the implementation principle is also the same and will not be repeated.

Below, in conjunction with the accompanying drawings, the third embodiment of the present document will be described.

Figure 13:
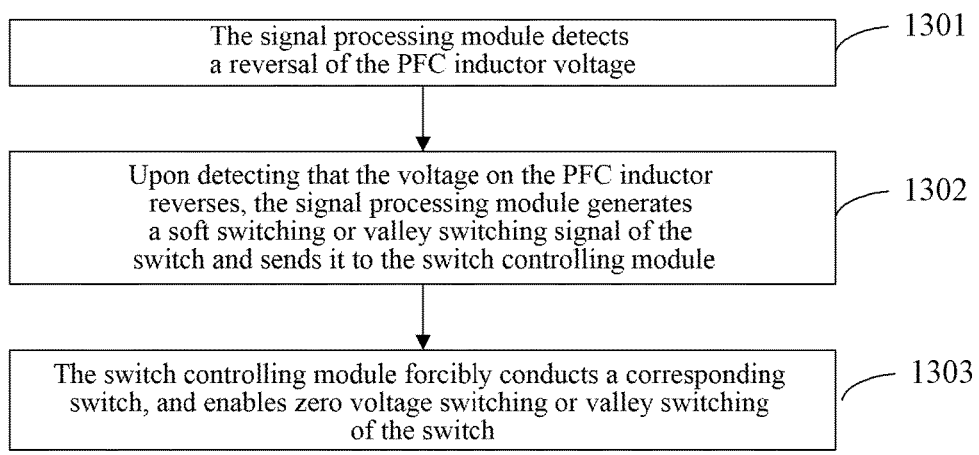
FIG. 13 is a flow chart of the totem pole bridgeless power factor correction soft switch control method provided in a third embodiment of the present document.

The embodiment of the present document provides a totem pole bridgeless PFC soft switch control method, to be combined with the totem pole bridgeless power factor correction soft switch control device provided in the first and second embodiments of the present document, to achieve a real-time detection of the PFC inductor voltage and control the switch in the totem pole bridgeless PFC circuit based on the detected result. In the embodiment of the present document, the totem-pole bridgeless PFC circuit being a switch is taken as an example, the process is shown in FIG. 13, comprising:

in step 1301, the signal processing module detects a reversal of the PFC inductor voltage;

in this step, the comparing unit of the signal processing module receives the voltage on the PFC inductor sent by the voltage detecting module.

In step 1302, upon detecting that the voltage on the PFC inductor reverses, the signal processing module generates a soft switching or valley switching signal of the switch and sends it to the switch controlling module;

in the embodiment of the present document, any switch in the totem pole bridgeless PFC circuit is turned off, and after the reverse recovery of the body diode of the switch is completed, the PFC circuit and the junction capacitor in the switch are resonant, the voltage on the PFC inductor generates a voltage reversal. See the related description in the first embodiment and the second embodiment of the present document.

In this step, 1. the comparing unit generates a square wave signal and sends it to the delaying unit of the signal processing module when the voltage on the PFC inductor reverses from positive to negative or from negative to positive;

2. the delaying unit delays the square wave signal and sends it to the channel selecting unit of the signal processing module;

3. the channel selecting unit selects the corresponding soft switching or valley switching signal of the switch based on the polarity of the voltage output by the input voltage polarity judging unit of the signal processing module, and sends it to the switch controlling module.

In step 1303, the switch controlling module forcibly conducts a corresponding switch, and enables zero voltage switching or valley switching of the switch.

The embodiment of the present document provides a totem pole bridgeless power factor correction soft switch control device and method to detect a reversal of a voltage on a PFC inductor, upon detecting that the voltage on the PFC inductor reverses, the signal processing module generates a soft switching or valley switching signal of the switch and sends it to the switch controlling module, to monitor the PFC inductor voltage in real time and achieve the circuit control based on the monitoring way, and to solve the problem of low efficiency of the totem pole bridgeless PFC circuit.

Those ordinarily skilled in the art can understand that all or some of the steps of the abovementioned embodiments may be implemented using a computer program process, and the computer program may be stored in a computer-readable storage medium and executed on an appropriate hardware platform (such as a system, equipment, device, component, and so on), and during the execution, it comprises one or a combination of the steps of the method embodiment.

Alternatively, all or some of the steps of the abovementioned embodiments can also be implemented with integrated circuits, these steps may be made into individual integrated circuit modules respectively, or some of the modules or steps can be made into a single integrated circuit module to implement. Therefore, the present document is not limited to any specific combination of hardware and software.

Each device/functional module/functional unit in the abovementioned embodiments may be implemented with universal computing devices, they can be concentrated on a single computing device or distributed on a network composed of a plurality of computing devices.

When each device/functional module/functional unit in the abovementioned embodiments is implemented in the form of software functional module and sold or used as an individual product, they may be stored in a computer readable storage medium. The abovementioned computer-readable storage medium may be a read-only memory, magnetic or optical disk, and the like.

Anyone familiar with the technical field of the art within the technical scope disclosed in the present document can easily conceive changes or replacements that shall fall within the protection scope of the present document. Therefore, the protection scope of the present document should be subject to the protection scope of the claims.

INDUSTRIAL APPLICABILITY

The embodiment of the present document achieves monitoring the voltage on the PFC inductor in real time and achieves a circuit control based on the monitoring way, and solves the problem that the efficiency of the totem pole bridgeless PFC circuit is low.

What is claimed is:

1. A totem pole bridgeless power factor correction (PFC) soft switch control device, comprising a totem pole bridgeless PFC circuit, wherein the totem pole bridgeless PFC circuit comprises at least two bridge arms connected in parallel between a first connecting point and a second connecting point, a first bridge arm comprises two switches or diodes connected in serial in a same direction, a second bridge arm comprises two switches connected in serial in a same direction, the totem pole bridgeless PFC circuit comprises at least one PFC inductor, and further a filter capacitor and a load connected in parallel between the first connecting point and the second connecting point, and the device further comprises:

a voltage detecting module, a signal processing module and a switch controlling module;

the voltage detecting module is connected to the PFC inductor of the totem pole bridgeless PFC circuit, and is configured to detect a voltage on the PFC inductor;

the signal processing module is connected to the voltage detecting module, and is configured to receive a voltage signal detected by the voltage detecting module, and when the voltage on the PFC inductor reverses from positive to negative or from negative to positive, output a square wave signal, and after a certain time delay, process the square-wave signal to become a soft switching or valley switching signal of a switch, and provide the signal to the switch controlling module;

the switch controlling module is connected to all switches of the totem pole bridgeless PFC circuit;

the voltage detecting module is further configured to output voltage signals of both terminals of the PFC inductor through two-channel outputs, be connected to a non-inverting input terminal of the comparing unit via one of the two-channel outputs, and connected to an inverting input terminal of the comparing unit via the other one of the two-channel outputs.

2. The totem pole bridgeless PFC soft switch control device of claim 1, wherein, the voltage detecting module is connected to both terminals of the PFC inductor via a resistor.

3. The totem pole bridgeless PFC soft switch control device of claim 1, wherein, the voltage detecting module is coupled to a core of the PFC inductor via a single inductor auxiliary winding.

4. The totem pole bridgeless PFC soft switch control device of claim 1, wherein, the voltage detecting module is coupled to the core of the PFC inductor through a first inductor auxiliary winding and a second inductor auxiliary winding, a first terminal of the first inductor auxiliary winding and a first terminal of the second inductor auxiliary winding are dotted terminals, a second terminal of the second inductor auxiliary winding and the first terminal of the second inductor auxiliary winding are connected together and grounded.

5. The totem pole bridgeless PFC soft switch control device of claim 1, wherein, the signal processing module comprises: a comparing unit, a delaying unit, an input voltage polarity judging unit and a channel selecting unit, wherein:

when the voltage on the PFC inductor reverses from positive to negative or from negative to positive, the comparing unit is configured to output a square wave signal to the delaying unit, the delaying unit is configured to send the square wave signal to the channel selecting unit after a certain time delay, and the channel selecting unit is configured to perform a channel selection to select a corresponding square wave signal of the voltage detecting module based on an input voltage polarity output by the input voltage polarity judging unit, and send the square wave signal to the switch controlling module.

6. A totem pole bridgeless PFC soft switch control method using the totem pole bridgeless PFC soft switch control device of claim 1, comprising:

a signal processing module detecting a reversal of a voltage on a PFC inductor;

when detecting that the voltage on the PFC inductor reverses, the signal processing module generating a soft switching or valley switching signal of a switch, and sending the signal to a switch controlling module.

7. The totem pole bridgeless PFC soft switch control method of claim 6, wherein, the signal processing module detecting a reversal of a voltage on a PFC inductor comprises:

a comparing unit of the signal processing module receiving the voltage on the PFC inductor sent by the voltage detecting module.

8. The totem pole bridgeless PFC soft switch control method of claim 7, wherein, the method further comprises:

after any one of the switches in the totem pole bridgeless PFC circuit is off and a reverse recovery of a body diode of the switch is completed, the totem pole bridgeless PFC circuit is resonant with a junction capacitor in the switch, and the voltage of the PFC inductor generates a voltage reversal.

9. The totem pole bridgeless PFC soft switch control method of claim 7, wherein, when detecting that the voltage on the PFC inductor reverses, the signal processing module generating a soft switching or valley switching signal of a switch and sending the signal to a switch controlling module comprises:

the comparing unit generating a square wave signal and sending the square wave signal to a delaying unit of the signal processing module when the voltage on the PFC inductor reverses from positive to negative or from negative to positive;

the delaying unit delaying the square wave signal and sending the square wave signal to a channel selecting unit of the signal processing module;

the channel selecting unit selecting a corresponding soft switching or valley switching signal of a switch based on a voltage polarity output by an input voltage polarity judging unit of the signal processing module, and sending the signal to the switch controlling module.

10. The totem pole bridgeless PFC soft switch control method of claim 9, wherein, after the step of when detecting that the voltage on the PFC inductor reverses, the signal processing module generating a soft switching or valley switching signal of a switch and sending the signal to a switch controlling module, the method further comprises:

the switch controlling module forcibly conducting a corresponding switch, enabling zero voltage switching or valley switching of the switch.

* * * * *